United States Patent [19]

Sakamoto et al.

[11] Patent Number: 4,924,163
[45] Date of Patent: May 8, 1990

[54] SIDE SUPPORT CONTROL DEVICE FOR USE IN A VEHICLE SEAT

[75] Inventors: Takao Sakamoto; Tomio Takano, both of Akishima, Japan

[73] Assignee: Tachi-S Company, Ltd., Tokyo, Japan

[21] Appl. No.: 411,271

[22] Filed: Sep. 22, 1989

[51] Int. Cl.$^5$ .......................... A47C 7/46; G05B 19/18
[52] U.S. Cl. .................................... 318/569; 318/466; 318/560; 297/284
[58] Field of Search ............... 318/466, 467, 468, 469, 318/470, 560, 569; 297/284, 311, 330, 353, 452, 460, 464, 486; 296/63, 64, 68.1, 147

[56] References Cited

U.S. PATENT DOCUMENTS

| | | |
|---|---|---|
| 4,370,000 | 1/1983 | Kazaoka et al. ...................... 297/284 |
| 4,401,928 | 8/1983 | Kamijo et al. ................... 318/467 X |
| 4,463,426 | 7/1984 | Caddick et al. ................. 318/466 X |
| 4,467,252 | 8/1984 | Takeda et al. ......................... 318/603 |
| 4,500,136 | 2/1985 | Murphy et al. ....................... 297/284 |
| 4,537,444 | 8/1985 | Maruyama et al. .................. 297/284 |
| 4,634,179 | 1/1987 | Hashimoto et al. ................. 297/284 |
| 4,655,505 | 4/1987 | Kashiwamura et al. ........... 297/284 |
| 4,689,537 | 8/1987 | Mizuta et al. ................... 318/466 X |

FOREIGN PATENT DOCUMENTS

| | | | |
|---|---|---|---|
| 57-80932 | 5/1982 | Japan | .................................. 297/330 |
| 60-97633 | 7/1985 | Japan | . |
| 60-97634 | 7/1985 | Japan | . |
| 197436 | 10/1985 | Japan | . |

*Primary Examiner*—Bentsu Ro
*Attorney, Agent, or Firm*—Browdy and Neimark

[57] ABSTRACT

A side support control device for use in a vehicle seat in which by an occupant's switch operation a motor is driven to thereby control the operation of a side support so as to prevent the occupant from losing his or her sitting position. In the control device, the number of rotations of the motor to move the side support is detected by a rotation sensor, the detected number of counts is stored in a counter memory in link with the switch operation, and the amounts of opening and closing of the side support can be adjusted quickly and easily by switch operations.

5 Claims, 6 Drawing Sheets

SIDE SUPPORT CONTROL DEVICE FOR USE IN A VEHICLE SEAT

BACKGROUND OF THE INVENTION

1. Field of the Invention

The present invention relates to a side support control device for use in a vehicle seat in which a motor is driven by means of a switching operation by an occupant of the seat to thereby control the operation of a side support so as to prevent the occupant from losing his or her sitting position.

2. The Prior Art

When a vehicle runs along curved roads, the occupant of the vehicle is subject to lateral forces that push the occupant to the side of the vehicle under the influence of centrifugal forces produced by driving around such curves. Due to this centrifugal force, the occupant may be forced to lose his or her sitting position, that is, the occupant may find it difficult to hold a predetermined sitting position and also the comfort of the occupant is greatly impaired. More particularly, if a driver is forced to lose his or her sitting position, then the driver's driving ability may be crippled thus endangering careful driving.

In view of the above, conventionally, there has been proposed and mounted to vehicle seats and particularly, the driver's seat, a side support control device which prevents the occupant from losing his or her sitting position by supporting the occupant properly.

For example, one of the conventional side support control devices includes a side support which is disposed in a seat back in such a manner that it surrounds the upper body of the occupant from both sides thereof. The side support is constructed such that it can press against the upper body of the occupant from both sides thereof to thereby restrict the occupant's upper body so as to be able to forcibly support the sitting position of the occupant. However, if the side support always presses against the upper body of the occupant from both sides thereof, then the freedom of the occupant's upper body is deprived thus impairing the sitting comfort of the occupant, which may make the occupant uncomfortable and/or tired. Thus, the side support is constructed such that it is normally situated in an open position in which the side support does not press against the occupant and it can be moved to a closed position (which is also referred to as a support position) only when it is necessary to support the sitting position of the occupant.

As the conventional side support control device, there is widely known a side support control device of a type that uses lateral accelerations (accelerations in the right and left directions) as parameters. The lateral accelerations can be detected directly by an acceleration sensor (for example, Japanese Utility Model Publication No. 60-97633), or they can be operated from the speeds of vehicles, the curvatures of curves and the like (for example, Japanese Patent Laid-open Publication (Tokkai) No. 61-67638). In this type of side support control device, if the lateral accelerations go beyond a reference value, then the side support is automatically moved to the support position thereof. Also, the parameters are not always limited to the acceleration. For example, in Japanese Utility Model Publication No. 60-97634, the vehicle speeds and the steering angles of a steering wheel are used as the parameters and, in Japanese Patent Laid-open Publication (Tokkai) No. 60-197436, the curvatures of curves and the vehicle speeds are employed as the parameters.

Also, there is known a so called "power" type of side support device which is arranged to move the side support directly by controlling the driving of a motor by means of a switching operation. In this system, as long as a switch is depressed, the motor is driven continuously, whereby arbitrary support or open positions can be manually set according to individual situations.

Now, as described before, in the first well known side support control device, the lateral accelerations, vehicle speeds, steering angles of the steering wheel and the like are used as the parameters, on assumption that the side support control device is used to control the side support when the vehicle is driven along the curves. For this reason, the side support control device is not able to control the side support properly when the vehicle is driven along bad roads or is caused to decelerate suddenly.

Also, the support position (or the closed position) that is most suitable for the occupant is not fixed but is varied according to the operating conditions of the vehicle. For example, when the vehicle moves along the curves, it is preferable to adjust the side support more narrowly (or harder) than in the normal support position thereof so as to ensure the stable position of the occupant. On the other hand, when stable driving conditions continue for a long time such as on expressways, it is preferable to set the side support more widely (loosely) than in the normal support position thereof, in order to prevent fatigue of the occupant.

However, in the above-mentioned well known side support control device employing the lateral accelerations and the like as the parameters, it is impossible to adjust the support position of the side support with ease according to the driving conditions.

Also, in this well known side support control device, after the side support is moved from the open position thereof to the support position thereof, for example, if the lateral acceleration which is being used as the parameter goes below the reference value and this condition continues for more than a given period of time the side support is to be returned to the open position thereof. For this reason, if the vehicle is repeatedly driven through curves in the mountains, for example, then the side support is frequently repeatedly opened and closed which is rather troublesome to the occupant. That is, such frequent repetition is not preferred from the viewpoints of careful driving and prevention of psychological fatigue.

On the other hand, in the side support control device of the power type, to move the side support during the driving of the vehicle, the switch must be depressed for a long period of time (up to about 8 seconds). For this reason, to control the side support during driving is not only troublesome but also provides an obstacle to safe driving, so that control of the side support during driving cannot be carried out easily.

Further, there are known side support control devices each of which is capable of controlling the support position of the side support properly according to individual situations by operating a switch. They are disclosed respectively in Japanese Patent Publication Nos. 62-101540 and 62-101541.

According to the above-mentioned type of side support control devices, it is possible to set a relax position which is looser than the support position selected by the occupant and a tight position tighter than the above-mentioned support position. And, by moving the side support from the support position to the relax position thereof or from the support position to the tight position thereof properly according to the situation, the occupant can be supported under a suitable pressure. Because of this, according to this type of side support control device, it is possible to adjust the support position of the side support easily according to the driving conditions of the vehicle.

The distances (that is, amounts of opening and closing) required for moving the side support from the support position (the initial position) thereof in the closing direction and in the opening direction in order to set the relax and tight position are different for the individual occupants and are not constant. Therefore, it is preferred that the amount of opening and closing can be easily adjusted quickly according to the tastes and physical condition of the occupants.

However, in the side support control devices respectively disclosed in Japanese Patent Publication Nos. 62-101540 and 62-101541, the amounts of opening and closing are previously set and thus, adjustment thereof according to the tastes and physical conditions of the occupants is difficult.

SUMMARY OF THE INVENTION

The present invention aims at eliminating the drawbacks found in the above-mentioned prior art devices.

Accordingly, it is an object of the invention to provide a side support control device for use in a vehicle seat which is capable of quickly and easily controlling the amounts of opening and closing of a side support, which are necessary to set a soft support position (that is, a relax position) and a hard support position (that is, a tight position), according to the tastes and physical condition of occupants by operating a switch.

In order to attain the above object, according to the invention, a side support control device is provided for use in a vehicle seat, in which the number of rotations of a motor is detected by a rotation sensor and the number of rotations detected is then stored in a counter memory in connection with a switch operation.

In other words, according to the invention, switch means is provided which is composed of a manual switch, an automatic switch of, for example, a self-maintaining type, and a set switch. The manual switch is arranged such that, if the manual switch is depressed then the motor can be driven continuously. For this reason, by operating the manual switch, the side support can be moved to an arbitrary position, that is, the side support can be moved sequentially to an arbitrary support position corresponding to an initial position, an arbitrary hard support position adjacent to the support position, and an arbitrary soft position also adjacent to the support position. And, after the manual switch is operated, if the set switch and automatic switch are not operated, then the number of counts is reset and the support position is stored as the initial position. Also, if the set and automatic switches are operated following the manual switch, then the numbers of counts of the motor at the respective positions are stored in the count memory and the support positions thereof are stored as a hard support position and a soft support position, respectively. If the hard and soft support positions are stored once, then the initial position and the hard support position or the soft support position can be set alternately by operating the automatic switch.

Also, after the hard and soft support positions are stored once, if the manual, set and automatic switches are operated successively, then another numbers of counts respectively corresponding to new hard and soft positions are stored to thereby be able to adjust or control the amounts of opening and closing of the side support.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof, in which.

DETAILED DESCRIPTION OF THE INVENTION

Figure 1:
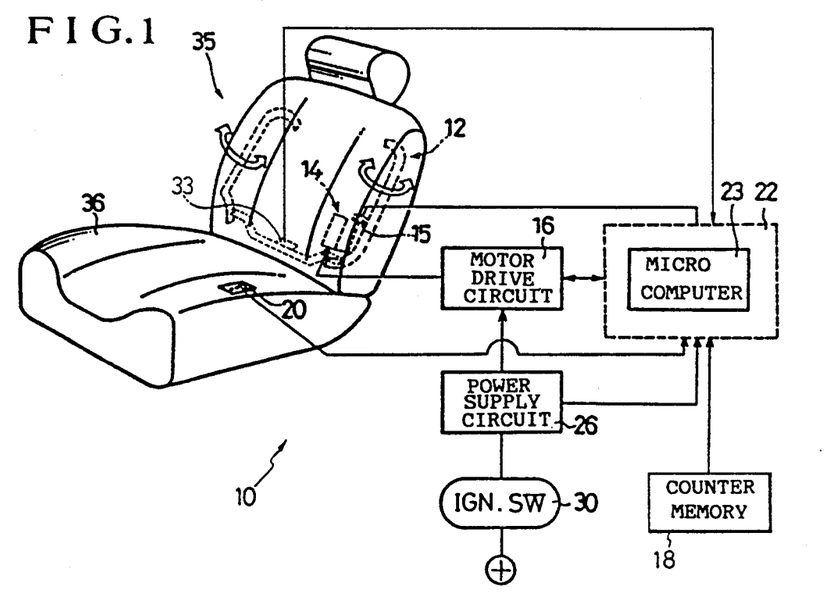
FIG. 1 is a general block diagram of a side support control device for use in a vehicle seat according to the invention.
Figure 2:
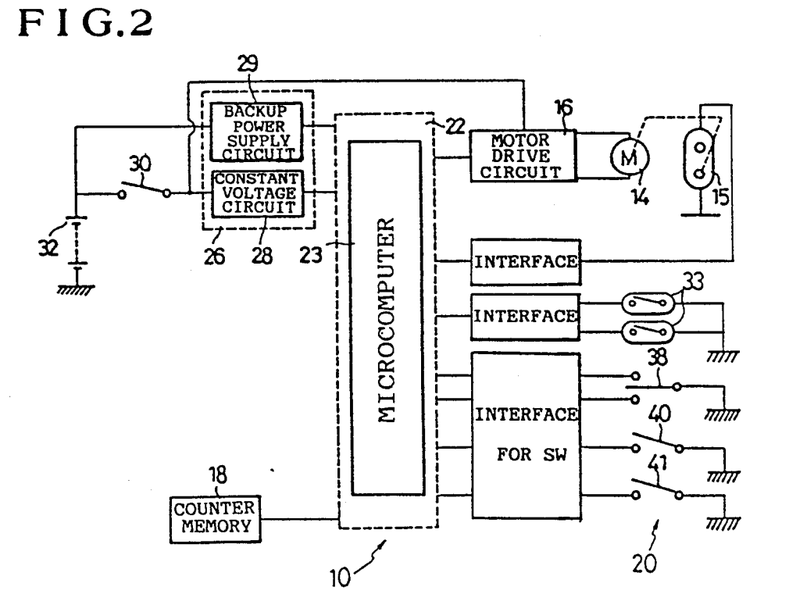
FIG. 2 is a detailed block diagram with a central processing unit as a center thereof.

As shown in FIGS. 1 and 2, a side support control device 10 for use in a vehicle seat includes a side support 12, a motor 14, a motor drive circuit 16, a counter memory 18, switch means 20 and a central processing unit 22.

The motor 14 is formed such that it includes a rotation sensor 15, for example, a lead switch type sensor. For the motor 14, normally, a DC motor is used. If the motor 14 is turned on, then the side support 12 is moved between the open position thereof and the support position (that is, closed position) thereof. In the support position thereof, the side support 12 is able to press against and support the occupant from two sides thereof to thereby prevent the occupant from losing his or her sitting position. The number of rotations of the motor detected by the rotation sensor 15 is input to the central processing unit 22 and is stored into the counter memory 18 as the number of counts, where it is compared with a previously existing number of counts.

The central processing unit 22 includes a microcomputer (a micro) 23. The micro 23 is arranged to deal with inputs in accordance with a stored program and to generate a proper control signal. The control signal is output, for example, to the motor drive circuit 16 to control the operation of the motor 14.

Also, the motor drive circuit 16 and the central processing unit 22 are respectively connected to a power supply circuit 26. The power supply circuit 22, as can be seen well from FIG. 2, includes a constant voltage circuit 28 and a backup power supply circuit 29 for holding of the counter memory. The constant voltage circuit 28 is connected through an ignition switch 30 to the positive pole of a battery 32.

Further, as can be understood from FIGS. 1 and 2, a limit switch 33 is disposed within a seat cushion 36 of a seat 35 and it acts in such a manner that it restricts the range of operations or movements of the side support 12. In other words. if the side support 12 is moved up to the limit open position (for example, full open position) thereof or to the limit support position, then the limit switch 33 is operated and the signal of the limit switch 33 is sent to the central processing unit 22. Responsive to this, the central processing unit 22 sends a stop signal to the motor drive circuit 16 to thereby stop the operation of the motor 14 immediately, so that the excessive movements of the side support 12 can be prevented.

The limit switch 33 is a single switch mechanism which is electrically connected with the motor 14. The switch 33 contains two switch elements, one of which is for stopping the opening movement of a pair of side support stays 42, 43 away from each other. The other element is for stopping the closing of those two side support stays 42, 43 towards each other. This selective switch actuation is controlled by an instruction, as required, from the main microcomputer 23.

Now, the switch means 20 is arranged such that it controls the driving of the motor 14 to thereby store and set an arbitrary support position as an initial position, and to store and set a hard support position and a soft support position which are respectively located adjacent to the arbitrary support position (initial position). And, according to the invention. the above-mentioned three support positions can be stored and set by means of a switching operation of the switch means 20.

Figure 3:
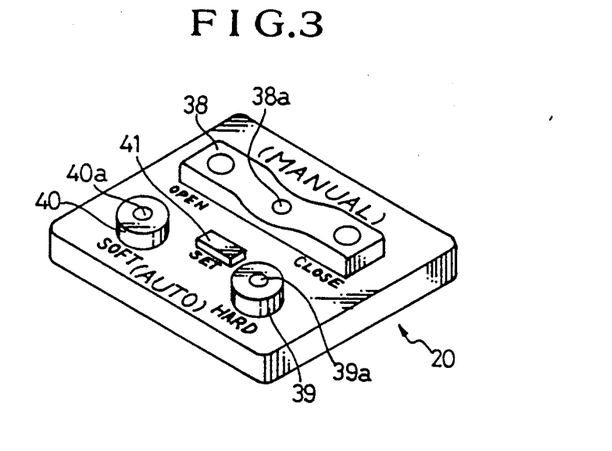
FIG. 3 is a perspective view of the switch means.

For example, the switch means 20, as shown in FIG. 3, includes a manual switch 38, two kinds of automatic switches, that is, a hard switch 39 and a soft switch 40, and a set switch 41 for storage. And, except for the set switch 41, LEDs (light emitting diodes) 38a, 39a and 40a are added to the switch means 20, i.e., manual switch 38, hard switch 39 and soft switch 40, which serve as light sources which are turned on or off responsive to the operation of the corresponding switches. In the illustrated embodiment, the switch means 20 is constructed in a panel shape thus taking into consideration ease of mounting and operability, and it is embedded in the left side of the seat cushion 36. However, the shape and mounting position of the switch means 20 are not limited to this. For example, the switch means 20 may be disposed in a center console, a roof, a vehicle wall, or the like. Also, devices other than the LEDs may be used as the light sources.

The manual switch 38 is embodied in the form of a seesaw type switch and is normally located in the neutral position thereof. And, if the manual switch 38 is depressed towards the left or right, then the motor 14 is driven continuously in the forward or reverse direction thereof (that is, in the closed or open direction thereof) and, if such depression is stopped (that is, the depressing force is removed), then the manual switch 38 returns to the neutral position thereof.

By operating the manual switch 38, the occupant can move the side support to an arbitrary position to thereby set a support position. That is, after seated, the occupant depresses the manual switch 38 in the close display direction, namely, in the right direction continuously to thereby drive the motor 14 continuously. Then, the occupant depresses the manual switch 38 right and left appropriately for fine adjustment and, after the side support 12 arrives at an arbitrary support position suitable for the occupant, if the depressing force is removed, then the manual switch returns to the neutral position thereof and the LED 38a of the manual switch turns on for a given period of time, for example, five seconds. After the elapse of five seconds, the counter memory 18 is reset and the number of counts becomes zero, so that the then support position is stored as an initial position. This completes the setting of the support position as the initial position.

The manual switch 38 can be operated, as mentioned above, not only when the support position as the initial position is stored, but also when the hard and soft support positions are stored.

On the other hand, the hard switch 39 and the soft switch 40 are constructed such that they can store and set the hard and soft support positions adjacent to the arbitrary support position stored as the initial position, respectively. When the occupant wishes the hard support position to support the occupant more firmly, then the hard switch 39 can be operated. Also, the soft switch 40 can be operated when the occupant feels that the support is too tight in the arbitrary support position (initial position) set by the occupant and thus wishes a more soft support (that is, the soft support position).

Further, the set switch 41 is constructed such that it allows the then support position to be stored.

The hard support position is stored in the following manner.

At first, the manual switch 38 is depressed in the right direction thereof to thereby move the side support slightly in the closing direction thereof so as to adjust the same to the occupant's desired tight support position. After then, the depressing force on the manual switch 38 is removed and, while the LED 38a of the manual switch 38 is on, that is, within five seconds, the set switch 41 is depressed. This causes the LED 38a to turn off and, if the hard switch 39 is depressed within further five seconds, then the LED 39a of the hard switch turns on and off several times and then goes off. Simultaneously when the LED 39a goes off, the number of counts is stored in the counter memory 18 and the then support position is stored as the hard support position, which completes the setting of the hard position.

Here, when another hard position has already been stored, if the set switch 41 is depressed, then the LEDs 39a and 40a respectively turn on for a given period of time, for example, for five seconds to indicate the storage of the previous hard position to thereby provide a warning to the occupant. In spite of the turning on of the LEDs 39a and 40a, if the hard switch 39 is depressed following the operation of the set switch, then a new number of counts is stored and the previously existing number of counts is erased.

The soft support position can be set similarly to the above-mentioned hard support position. That is, at first, by depressing the manual switch 38 continuously in the left direction thereof, the side support is moved slightly in the open position thereof to thereby adjust the same to the occupant's desired soft support position. Then, by depressing the set switch 41 and soft switch 40 successively within a given period of time, the number of counts is set and the then support position is stored and set as the soft support position. Also, when another soft support position has been previously stored, similarly to the above-mentioned hard support position, if the set switch 41 is depressed. then the LEDs 39a and 40a turn on for a given period of time, thereby providing a warning to the occupant. However, this is not always limitative, but, alternatively, only one of the LEDs 39a, 40a may turn on according to individual situations.

As mentioned above, by depressing on the manual switch 38, the side support position is stored as the initial position. For this reason, the initial position according to the tastes and physical condition of the occupant can be stored by means of a switch operation and also such initial position can be set quickly and easily.

Also, after the manual switch 38 is depressed for a short time, if the hard switch 39 and soft switch 40 are depressed following the set switch 41, then the latest number of counts is stored as the information (the number of counts) on the hard and soft support positions. Then, the hard and soft support positions are stored. Due to this, the amounts of opening and closing of the side support with the initial position as a center can be stored by means of successive switch operations and at the same time the amounts of opening and closing according to the tastes and physical conditions of the occupant can be adjusted quickly and with ease.

In addition to the above-mentioned storage functions, the switch means 20 has a one-touch function (switch function). Due to the one-touch function, the initial position and the hard or soft support position can be set alternately with a one-touch switch operation.

In other words, after the hard support position is stored, if the hard switch 39 is pressed, then the motor 14 is continuously driven in the closing direction until the number of counts reaches the number of counts previously stored in the counter memory 18, for example, +n (in this case, the number of counts is expressed by signs +for the closing direction and for the opening direction). The side support 12 is moved to the hard support position and thus the hard support position is set. In this hard support position, the side support 12 is able to support the occupant with great strength to thereby firmly prevent the occupant from losing her or his sitting position. After then, if the hard switch 39 is pressed down again, then the motor 14 is driven in the opening direction until the number of counts reaches zero and thus the side support 12 returns to the initial position.

Also, after the soft support position is stored, if the soft switch 40 is pressed, then the motor 14 is driven in the opening direction until the number of counts reaches the number of counts previously stored, for example, thereby setting the open position. And, if the soft switch 40 is pressed again, then the motor 14 is driven in the closing direction until the counter memory reaches zero, thereby returning the side support 12 to the initial position.

In the illustrated embodiment, the hard switch 39 and soft switch 40 are embodied respectively in the form of a pushbutton switch of a self-maintaining type which, when depressed once, is maintained in the depressed (on) state. However, they are not always limited to this. Also, the switch means 20 may be composed of other switches. For example, the manual switch 38 may be composed of a manually closing switch and a manually opening switch.

Figure 4:
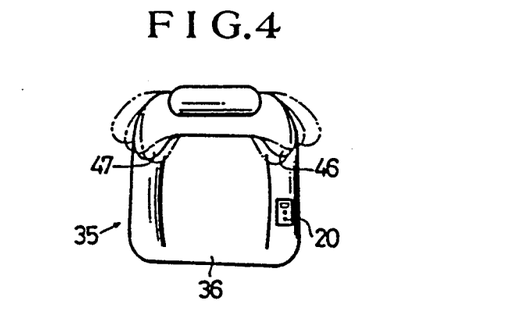
FIG. 4 and FIG. 5 are respectively general plan and front views of a vehicle seat provided with a side support control device.
Figure 5:
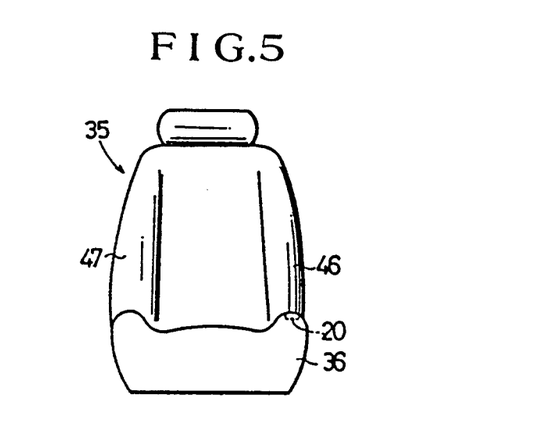

The side support 12 is arranged such that it presses against the upper body of the occupant from both sides thereof to thereby support the same upper body, and is also arranged such that it is able to move between the support position, in which the side support 12 applies a support force to the upper body of the occupant to thereby support the same, and the open position in which the side support applies no support force to the upper body of the occupant. Also, when the vehicle comes to a halt or backs up, the side support 12 provides an obstacle and, therefore, the side support is moved to the full open position, thereby making it easier for the occupant to climb in and out. The full open position can be set by operating the manual switch 38. That is, as can understood from FIG. 4, when the driver or the like climbs out or in, the side support 12 is moved to the full open position shown by a two-dot chained line. When the driver or the like (occupant) is seated and starts the vehicle, the side support 12 is moved to an arbitrary support position (initial position) shown by a solid line and is maintained there (see FIG. 5). And, while the vehicle is running, the side support 12 is moved to the hard support position or the open position (both of which are shown by one-dot chained lines) with an arbitrary support position between them, according to the desires of the occupant.

The side support 12 is generally constructed in the following manner. The motor 14 is driven responsive to a control signal from the motor drive circuit 16 to thereby rotate right and left support stays 42 and 43 as can be understood from FIG. 6. The rotation sensor 15, which comprises a lead switch type sensor and is included in the motor 14, is used to detect the rotation of the motor 14. In the illustrated embodiment, the support stays 42 and 43 are interconnected with each other by means of a connecting link 44. In particular, the support stay 42 is driven directly by means of the driving force of the motor 14 and the driving force is transmitted through the connecting link 44 to the support stay 43. The support stays 42 and 43 are disposed in side support portions 46 and 47 (see FIGS. 4 and 5), respectively, and with the rotational movements of the support stays 42 and 43, the side support portions 46 and 47 are moved between the hard support position and the open position, respectively. The motion of the connecting link 44 is limited by the limit switch 33 (see FIG. 1).

Figure 6:
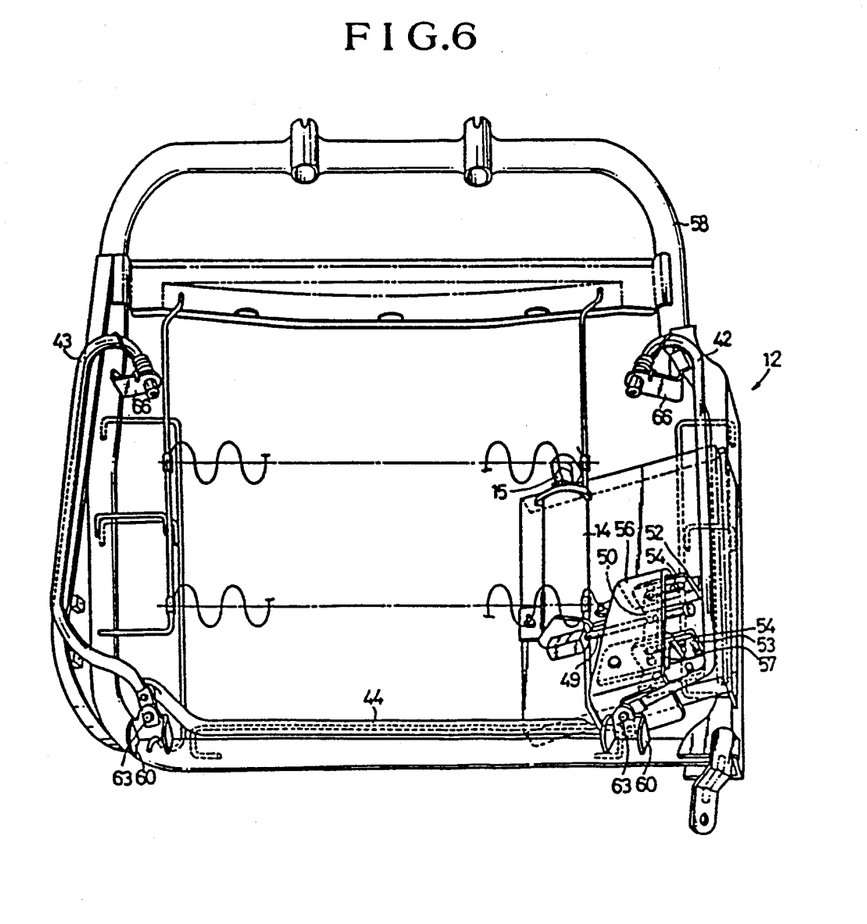
FIG. 6 is a general perspective view of a side support of a side support device.
Figure 7:
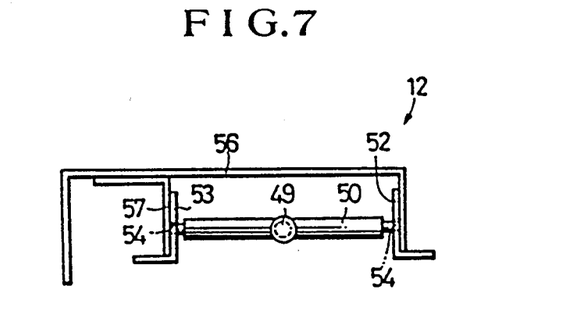
FIG. 7 is a right side view of a support plate.

Referring to the structure of the side support 12 along the transmission route of the driving force, as shown in FIG. 6, the motor 14 has an output shaft 49 which is composed of a lead screw. The lead screw 49 is extended through a tapped hole formed in a shaft 50. As can be seen well from FIG. 7 in addition to FIG. 6, the respective end portions of the shaft 50 are extended through enlongated guide grooves 54 formed in support plates 52 and 53, respectively, and are also fixed to the right wall of the support frame 56 and to a support plate 57, respectively. Here, the support plates 52 and 53 are respectively fixed to a seat back frame 58 and the support plate 57 is fixed to the support frame 56. Brackets 60 are fixed to the seat back frame 58 and each end of the support stay 42 is pivotally mounted to one of the brackets 60 by means of pins 63. One end of the connecting link 44 is fastened to the left wall of the support frame 56 with a pin, while the leading end of the connecting link 44 is fastened to the leading end portion of the support stay 42 with a pin. And, the other end of the connecting link 44 is connected to the support stay 43 and one end of the support stay 43 is pivotally mounted to the left bracket 60 by means of the pin 63. Of course, the other ends of the support stays 42 and 43 are rotatably mounted to a bracket 66, respectively.

In the above-mentioned structure, if the motor 14 is driven, then the support stays 42 and 43 are rotated about the pins 63. In other words, if the motor 14 is driven to thereby rotate the lead screw 49, then the shaft 50, which is threadedly connected with the lead screw 49, is slid right and left along the guide groove 54. And, integrally with the shaft 50, the support frame 56 is slid together with the connecting link 44. For example, if the support frame 56 is slid right in FIG. 6, then the connecting link 44 is also slid right and the support stay 43 is pulled by the connecting link 44 and is rotated clockwise (inwardly or in the closing direction) about the pin 63. Also, the support stay 42 is pushed by the connecting link 44 and is rotated counter-clockwise (inwardly) about the pin 63.

On the other hand, if the support frame 56 and connecting link 44 are slid left, then the support stay 43 is pushed by the connecting link 44 to be rotated counter-clockwise (outwardly, or in the opening direction) and the support stay 42 is pulled by the connecting link 44 to be rotated clockwise (outwardly). In this manner, the two support stays 42 and 43 are always rotated in the same direction, whereby the side support portions 46 and 47 are also rotated in the same direction to thereby move the side support 12 in the opening or closing direction.

However, the above-mentioned structure of the side support 12 is an example and is not limitative. For example, two motors may be used instead of the motor 14 and the rotational movements of the support stays 42 and 43 may be controlled individually.

Now, description will be given in detail of a side support control system according to the above-constructed side support device 10 with reference to flow charts respectively shown in FIGS. 8 to 10. At first, after the occupant is seated, the main switch of the side support device 10 is turned on. Normally, the ignition switch 30 of the vehicle serves as the main switch, too, and, therefore, by turning on the ignition switch 30, the main switch can also be turned on automatically (70). Thereafter, the occupant adjusts the amounts of opening or closing of the side support to thereby store and set the three support positions (a support position ideal in the normal driving of the vehicle, namely, an initial position, and hard and support positions respectively adjacent to the initial position) according to his or her taste and physical condition.

Figure 9:
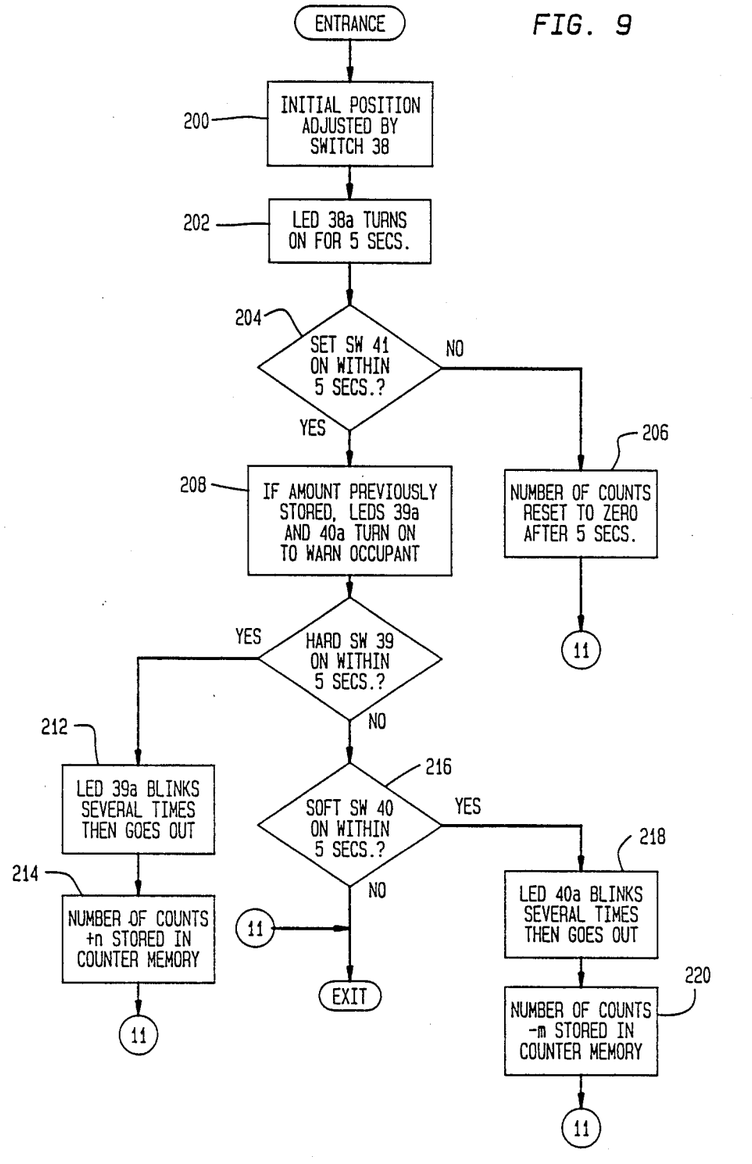
Figure 10:
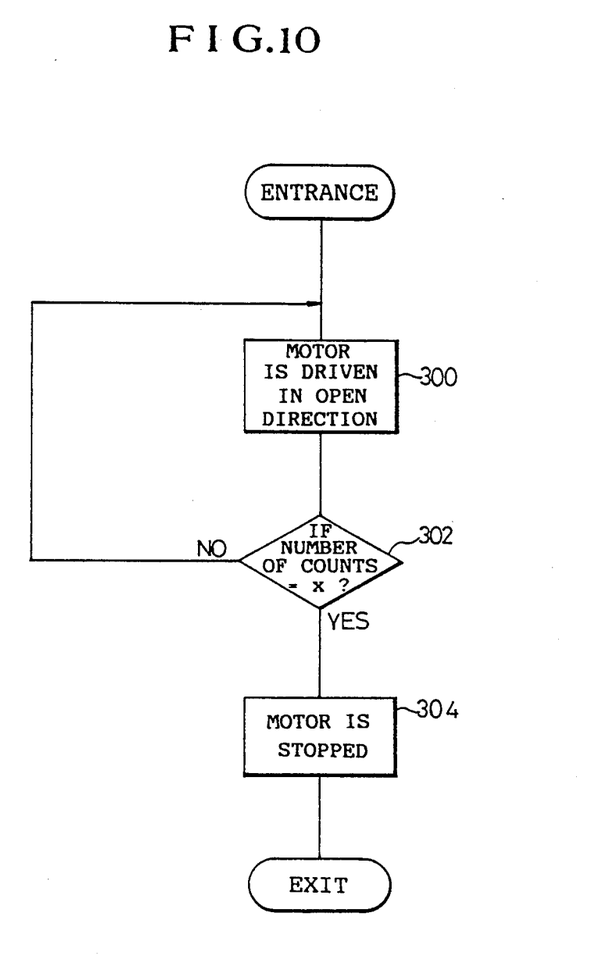

These three support positions are stored according to a subroutine shown in FIG. 9 (71). At first, the occupant presses down on the manual switch 38 until the side support 12 reaches a desired position to thereby adjust the support position as the initial position (200). After such adjustment, the LED 38a of the manual switch 41 turns on (202) and it is checked whether or not the set switch 41 is depressed within 5 seconds (204). If the set switch 41 is not depressed within 5 seconds, then the number of counts corresponding to the number of rotations of the motor 14 up to the position is reset and the number of counts at the initial position is stored as zero (206).

If the set switch 41 is depressed within 5 seconds, when the amounts of opening and closing corresponding to the hard and soft support positions are previously stored, then both of the LEDs 39a and 40a turn on to indicate the presence of the amounts of opening and closing previously stored to thereby provide a warning to the occupant (208). And, it is checked whether or not the hard switch 39 has been depressed within 5 seconds (210).

In spite of the turning on of the LEDs 39a and 40a, if the hard switch 39 is depressed within 5 seconds, then the LED 39a turns on and off or blinks several times and then turns out (212). Simultaneously with the turning off of the LED 39a, the previous stored number of counts is erased and the then number of counts (+n) is newly stored in the counter memory 18 (214). But, if the hard switch 39 has not been depressed within 5 seconds, then it is checked whether or not the soft switch 40 has been depressed within 5 seconds or not (216).

If the soft switch is pressed down within 5 seconds, then the LED 40a turns on and off several times and then turns off (218) and the then number of counts (−m) is stored in place of the previously stored number of counts (220).

In this manner, if the hard switch 39 or the soft switch 40 is depressed within a given period of time (210, or 216), then the number of counts (+n, −m) are updated, whereby the hard or soft support position can be newly stored.

Also, if the hard switch 39 or the soft switch 40 is not pressed down within a given period of time (210, or 216), then the previously stored number of counts is preserved and the program moves to the exit of the sub-routine at once.

Figure 8:
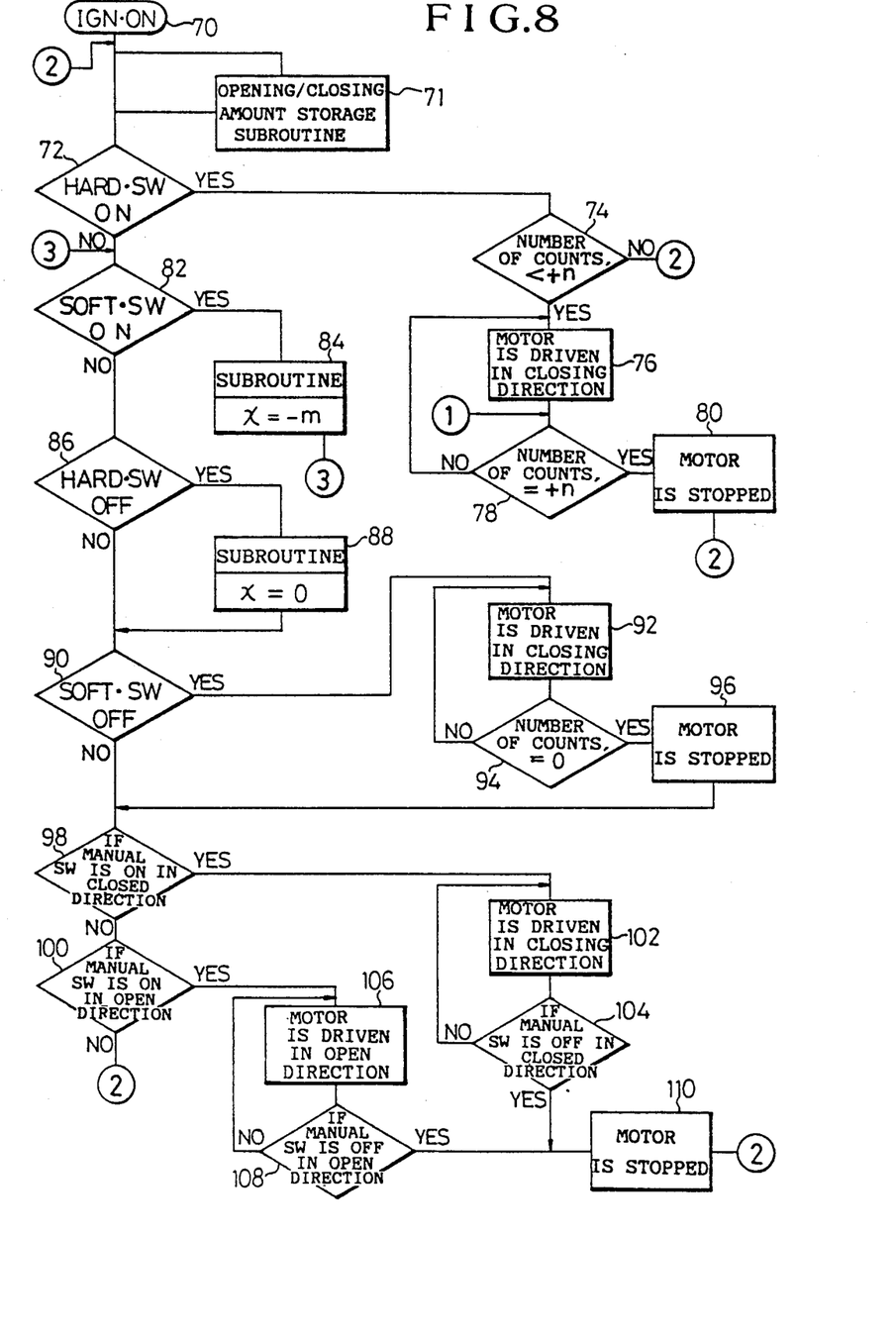
FIGS. 8 to 10 are flow charts of a side support control device according to the invention.

Now, after the desired support position as well as the hard and soft support positions adjacent to the desired support position are stored, if the set switch 41 is pressed down, then YES is decided in (72) in FIG. 8. Thereafter, it is checked whether or not the number of counts is less than (74) and the motor 14 is driven in the closing direction until the number of counts reaches +n (76, 78). And, when the side support 12 reaches the hard support position and thus the number of counts reaches +n, the motor 14 is caused to stop (80) and it is returned to an initial state [2]. In this manner, the hard support position can be set by means of the one-touch operation of the hard switch 39.

If the hard switch 39 is not depressed, then it is checked whether or not the soft switch 40 is depressed (82). If the soft switch 40 is found depressed, then it is decided that x=−m (84) in a sub-routine shown in FIG. 10, the motor 14 is driven in the opening direction (300), and it is determined whether or not the number of counts is −m (302). If the number of counts is found not −m, then the motor 14 is driven in the opening direction until the number of counts reaches −m (300, 302). And, when the side support 12 arrives at the soft support position and the number of counts reaches −m, then the motor is caused to stop (304) and the program moves to the exit of the sub-routine. In this manner, almost similarly to the hard support position, the soft support position can be set by means of the one-touch operation of the soft switch 40.

When both of the hard switch 39 and soft switch 40 are not depressed, then in FIG. 8 it is checked whether the hard switch 39 is off or not (86). And, if the hard switch 39 is depressed again and is thus turned off, then it is decided that x=0 (88) and thus the program is processed in accordance with the subroutine in FIG. 10, so that the side support 12 is returned to the initial position.

Also, when the hard switch 39 is not pressed down again, then it is next checked whether the soft switch 40 is pressed down again (90). If the soft switch 40 is found depressed again, then, until the number of counts gets to zero, the motor 14 is moved in the closing direction (92, 94) and, if the number of counts becomes zero, then the motor 14 is caused to stop (96). As a result of this, the side support 12 is returned to the initial position.

In this manner, if either of the hard switch 39 or the soft switch 40 is depressed again, then, until the number of counts arrives at zero, the motor 14 is driven and the initial position is set again.

On the other hand, when both of the hard switch 39 and the soft switch 40 are not depressed again, then it is next checked whether the manual switch 38 is closed or opened (98, 100), respectively. If the manual switch 38 is not closed nor opened, then the motor is immediately returned to the initial condition [2]and waits there.

If the occupant wishes to change the hard position for tighter support, then the manual switch 38 is depressed in the closed direction. As a result of this, in (98) YES is decided and thus, until the manual switch is depressed in the closed direction, the motor 14 is driven in the closing direction (102, 104). And, when the side support has been moved to the desired support position and the adjustment of the support position has been completed, then the manual switch 38 is returned to its neutral position. As a result of this, the motor 14 is caused to stop (110) and is returned to the initial position [2].

Also, if in (100) YES is decided and the manual switch 38 is pressed down in the open direction, then the motor 14 is driven in the open direction (106, 108) to thereby adjust an arbitrary support position. After then, if the depressing of the manual switch 38 is stopped and the manual switch is returned to its neutral position, then the motor 14 is caused to stop (110) and is then returned to the initial position [2].

Then, if the set switch 41 and hard switch 39 are successively pressed down within 5 seconds (204, 210), then the then number of counts +n is newly stored (214) to thereby complete the adjustment of the hard support position. Also, if, following the set switch 41, the soft switch 40 is depressed within 5 seconds (204, 216), then the then number of counts is stored as −m (220), thereby completing the adjustment of the soft support position.

After the initial position, hard support position and soft support position are stored in the above mentioned manner, if the vehicle comes to a mountain road or a bad road and the occupant wishes a stronger support, then the hard switch 39 is pressed down and is turned on. Then, in (72), YES is decided, whereby, until the number of counts gets to +n, the motor 14 is driven in the closing direction (74, 76, 78, 80), so that the hard support position can be set with a one-touch operation.

After then, if the vehicle goes out of the mountain or bad road and goes back to a normal road and thus such stronger support is not necessary, then the hard switch 39 is pressed down again to turn off, whereby the program proceeds through steps (82, 86) to step (88), that is, until the number of counts arrives at zero, the motor 14 is driven in the open direction and is then returned to the initial position (300, 302, 304).

Also, when the vehicle goes from the normal road into an expressway or freeway and the occupant wishes a softer support, then the soft switch 40 is pressed down to turn on. Then, in step (82) YES is decided and thus, until the number of counts reaches −m, the motor 14 is driven in the open direction (84, 300, 302, 304), so that the soft position can be set with a one-touch operation.

After then, when the vehicle goes back again into the normal road, then the soft switch 40 is pressed down again to be turned off, whereby, until the number of counts reaches zero through steps (82, 86, 90), the motor 14 is driven in the closing direction and is then returned to the initial position (92, 94, 96).

As described above, according to the invention, after the occupant sets an arbitrary support position, if the hard switch 39 or the soft switch 40 is pressed down timely according to the occupant's judgment, then the hard support position or soft support position can be set with a one-touch operation. Also, if the hard switch 39 or soft switch 40 is pressed down again to turn off, then the side support can be returned to the best support position (that is, initial position) that has been set initially.

And, even after the hard or soft support position is set once, if the manual switch 38 is pressed, then the support position can be set. By depressing the set switch 41, hard switch 39 or soft switch 40 timely following the manual switch 38, the then support position can be newly stored as the hard or soft support position. That is, the amounts of opening and closing of the side support 12 from the initial position thereof can be set and adjusted arbitrarily by successive switch operations.

Also, when the support position is set once, it is maintained in a fixed manner unless the hard switch 39 is depressed again or the manual switch 38 is operated according to the occupant's judgment. Because of this, the need for the side support 12 to be opened o closed frequently is eliminated and also the possibility of the occupant being mentally fatigued is avoided. And, according to the above-mentioned side support control device of the invention, the side support can be controlled quickly and easily not only along the curving roads but also even along the bad roads, sudden accelerating or decelerating and other hard operations. That is, the present side support control device is capable of dealing properly with such hard driving conditions of the vehicle.

Further, as illustrated, the LEDs 38a to 40a are included as the light sources in the switch means 20, are caused to turn on for a given period of time responsive to switch operations to urge the following operations, and are stored after the lapse of a given period of time. Also, when a memory is previously stored, the LEDs 39a and 40a are caused to turn on and off for given period of time to thereby provide warning to the occupant. The above-mentioned structure is easy to see, can prevent misoperations, and can be operated quickly and easily.

It is to be understood that the foregoing description is a preferred embodiment of the present invention and there is no intention to limit the invention to the specific forms disclosed, but, on the contrary, the invention is to cover all modifications, alternative constructions and equivalents falling within the spirit and scope of the invention as expressed in the appended claims.

For example, although in the illustrated embodiment the side support device 10 is mounted to the seat back to be able to support the upper body of the occupant, the side support device may be mounted to the seat cushion to be able to support the femoral regions of the occupant.

As has been described hereinbefore, according to the side support control device for use with a vehicle seat constructed in accordance with the present invention, after an arbitrary support position (initial position) as well as hard and soft support positions respectively adjacent to the arbitrary support position are set once, by timely operating the switch means, the side support can be controlled by a one-touch operation while the vehicle is running. Due to this, the control of the side support during the vehicle operation can be performed quickly and easily to thereby prevent the occupant from losing his or her sitting position.

Also, when the closed position is set once, it is maintained unless it is removed by the will of the occupant. Therefore, even in the curving roads or the like, the possibility that the side support may be opened and closed frequently regardless of the will of the occupant is eliminated. This prevents the occupant from being mentally fatigued to thereby ensure safe driving.

Further, besides along the curving roads, the bad roads and sudden accelerating or decelerating as well, the closed position can be set quickly and easily to thereby be sure that the occupant is prevented from losing his or her sitting position.

Moreover, the hard and soft support position once set can be changed by operating the switch means according to the occupant's desires.

In addition, due to the fact that the LEDs are included as the light sources in the switch means and that they can be turned on or off responsive to the switch operation, the switch means is easy to see and mis-operations can be prevented, and at the same time the switch means can be operated quickly and easily. Because of this, the adjustment, storage and setting of the support can be performed with ease.

What is claimed is:

1. A side support control device for use with a vehicle seat, comprising:
   a side support movable between a support position to press against and support an occupant of the seat from both sides thereof to thereby prevent said occupant from losing the sitting position thereof and an open position spaced apart from said occupant;
   a motor with a rotation sensor for moving said side support;
   a motor drive circuit for driving said motor;
   a counter memory for storing the number of rotations of said motor as a number of counts;
   switch means including a manual switch adapted to be depressed for continuously driving said motor to thereby move said side support to an arbitrary support position corresponding to an initial position and to arbitrary hard and soft support positions respectively adjacent to said initial position, an automatic switch operable for storing and setting said hard and soft support positions, and a set switch operable prior to the operation of said automatic switch when said hard and soft support positions are stored, said switch means being arranged such that, after the operation of said manual switch, if said set switch is not operated then the support position thereof is stored as said initial position; and,
   a central processing unit connected to said motor drive circuit for processing information input therein in accordance with a given program.

2. A side support control device as set forth in claim 1, wherein said switch means is constructed in a panel type device including therein, as light sources, LEDs which are respectively responsive to the operations of said switches to turn on or off.

3. A side support control device as set forth in claim 1, wherein said manual switch of said switch means is arranged such that, when said manual switch is depressed, said motor is driven and wherein said automatic switch and said set switch of said switch means are arranged such that, in order to store said hard and soft support position, if said set and said automatic switches are operated successively, then the number of counts from said initial position is stored in said counter memory.

4. A side support control device as set forth in claim 2, wherein said manual switch of said switch means is arranged such that, when said manual switch is depressed, said motor is driven and wherein said automatic switch and said set switch of said switch means are arranged such that, in order to store said hard and soft support position, if said set and said automatic switches are operated successively, then the number of counts from said initial position is stored in said counter memory.

5. A side support control device as set forth in claim 1, wherein said automatic switch is constructed in the form of a self-maintaining type switch and said automatic switch comprises a hard switch arranged such that, if said hard switch is depressed following the operation of said set switch, then said hard support position can be stored and, if said hard switch is depressed independent of the operation of said set switch, then said motor is driven from said initial position in the closing direction until the number of counts reaches a previously stored number of counts, to thereby move said side support to said hard support position, and thereafter, if depressed again, then said motor is driven in the opening direction, until said counter memory arrives at zero, to thereby return said side support to said initial position; and, a soft switch arranged such that, said soft switch is depressed following the operation of said set switch, then said soft support position can be stored and, if said soft switch is depressed independent of the operation of said set switch, then said motor is driven from said initial position in the opening direction, until the number of counts reaches a previously stored number of counts, to thereby move said side support to said soft support position, and thereafter, if depressed again, then said motor is driven in the closing direction, until said counter memory arrives at zero, to thereby return said side support to said initial position.

* * * * *